Nov. 26, 1935.  E. BOECKING  2,022,366
GATE AND LENS STRUCTURE FOR MOVING PICTURE FILM
Filed March 8, 1934    2 Sheets-Sheet 2
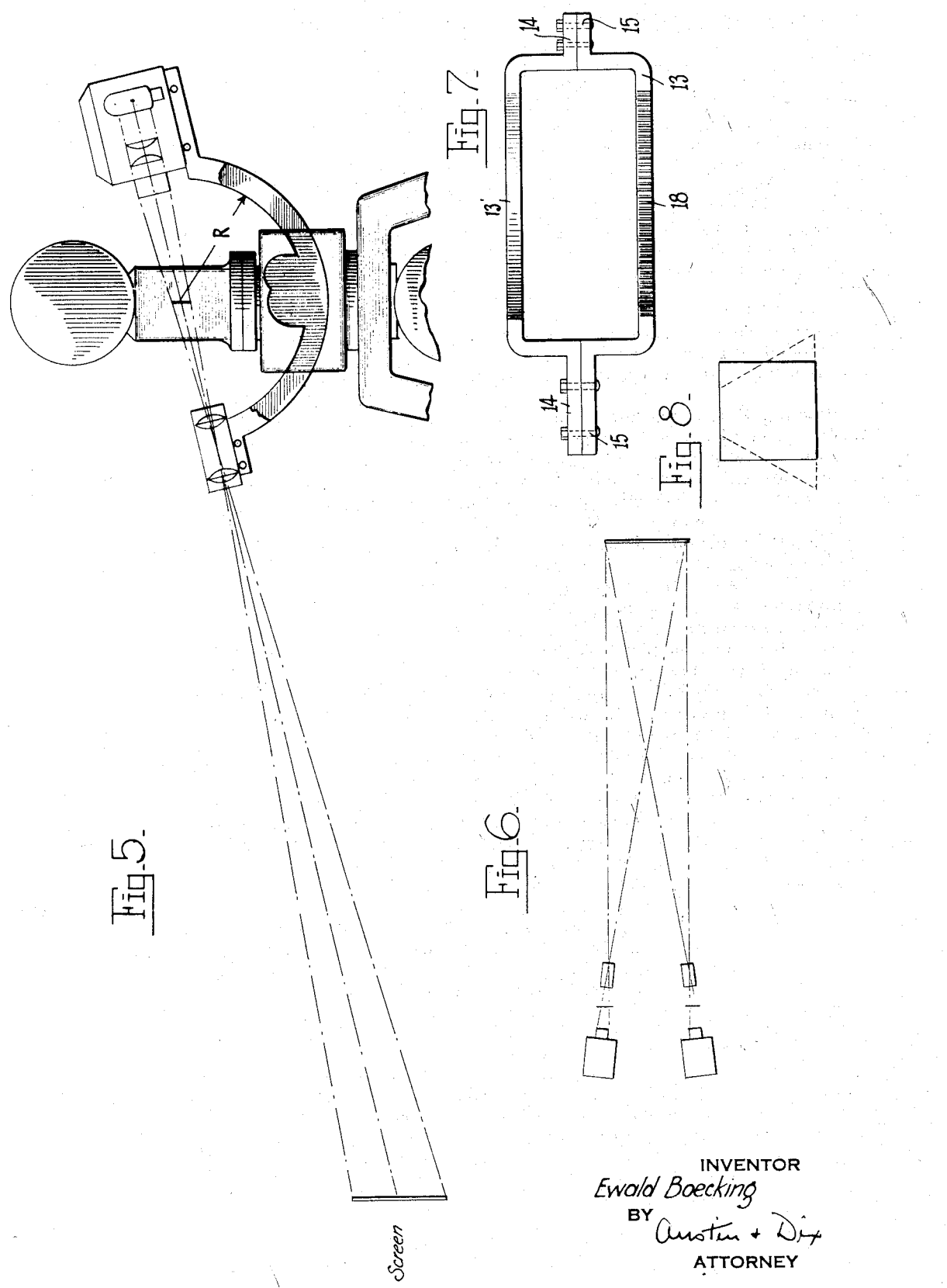
INVENTOR
Ewald Boecking
BY
ATTORNEY Patented Nov. 26, 1935

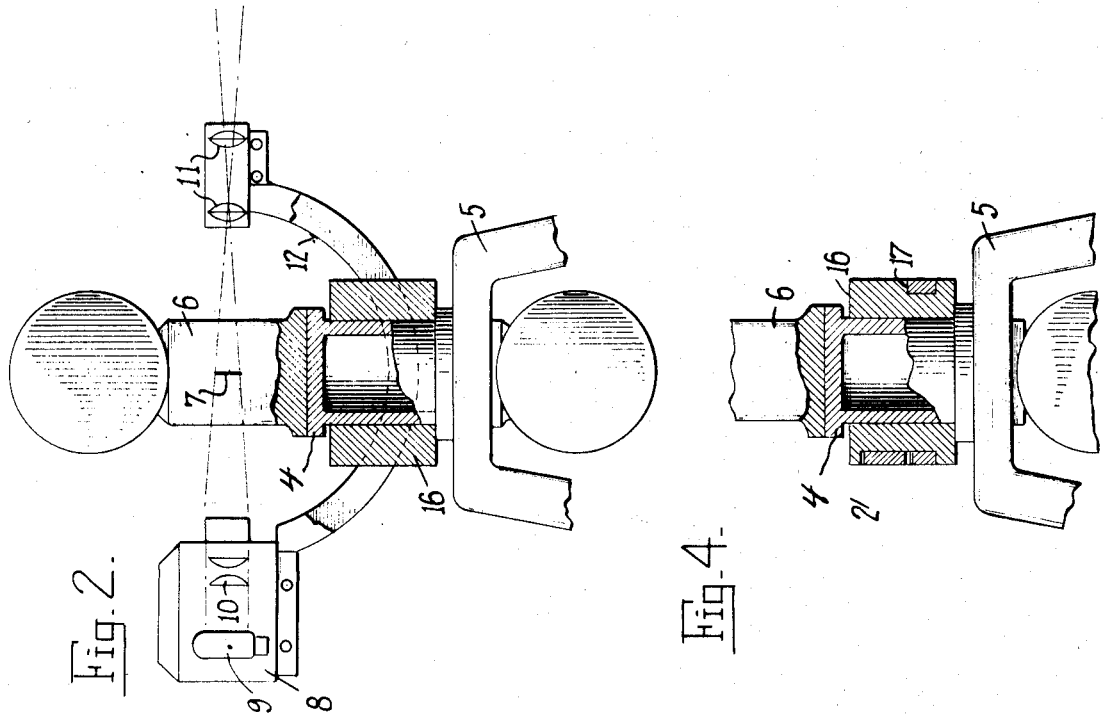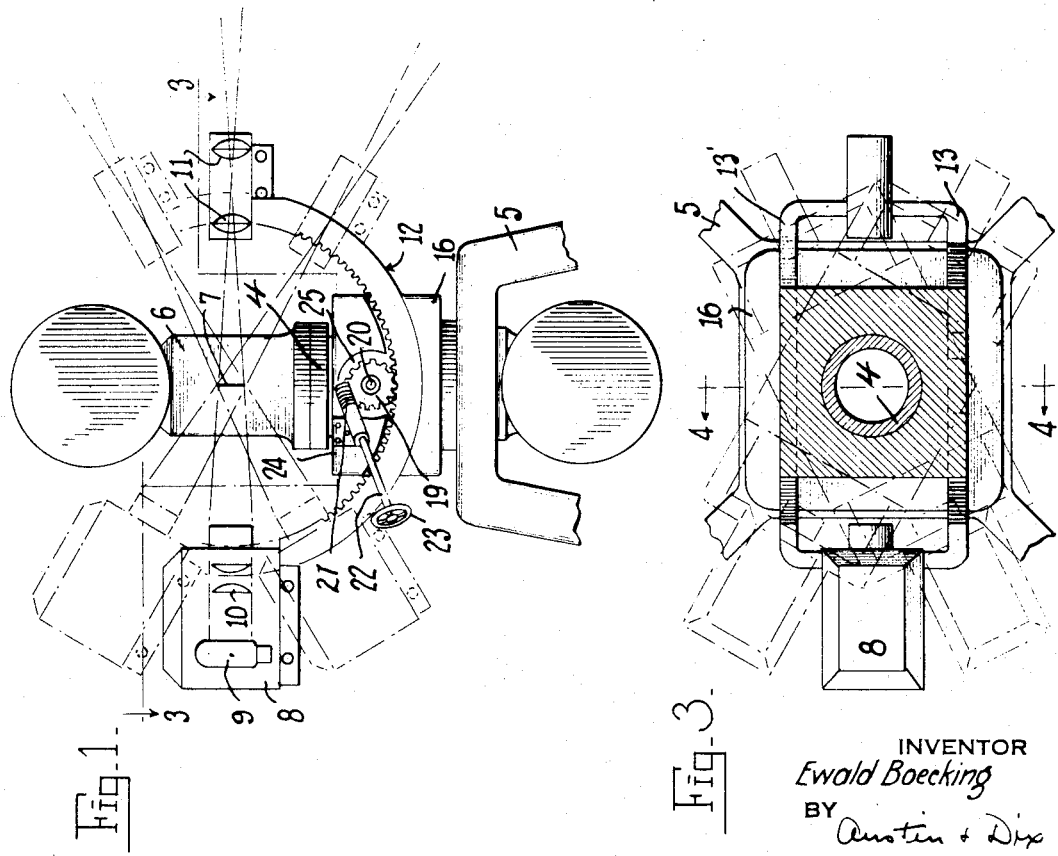

2,022,366

UNITED STATES PATENT OFFICE 2,022,366

GATE AND LENS STRUCTURE FOR MOVING PICTURE FILM

Ewald Boecking, Brooklyn, N. Y., assignor to International Projector Corporation, New York, N. Y., a corporation of Delaware Application March 8, 1934, Serial No. 714,569

7 Claims. (Cl. 88—24)

This invention relates to motion picture projecting machines and more particularly to a novel mounting of the film gate and optical system of such a projecting machine so that they may be tilted with respect to each other.

In most motion picture theatres the projecting machine is at a considerable height above the screen. In other words, the light rays from the projecting machine incline downwardly at an angle to the horizontal varying from a few degrees to 18°, or even more. The result has been that when the screen is vertical, as it often has to be where a drop screen is employed, for instance in houses in which the screen is raised during a stage show, the plane of the screen cuts the projected light beam at an angle to the optic axis, and the pictures shown are thus narrower at the top and wider at the bottom than they should properly be. If the gate be tapered to make the picture appear rectangular in outline, portions of the picture are then blocked off, without overcoming the difficulty, for the figures in the lower part of the picture are still out of focus, because the picture can be accurately focussed only with respect to the optic axis. For instance, a character's feet appear unduly large.

Moreover, the pictures are distorted on the screen where the projecting machine is off-center, or in other words where it is on one side of the center of the house, or more particularly at one side of a plane at right angles to the screen and passing through the center of the screen.

Through the present invention the disadvantages mentioned are overcome.

A feature of the invention resides in the provision of a novel combination including means for mounting the projector film gate device and means for mounting the optical device so that one device may be tilted with respect to the other, in order to produce a more perfect showing of the pictures than has heretofore been possible, where the projector is a considerable distance above (or below) the screen.

More specifically, a feature resides in providing for mounting the gate and lens system so that one may be tilted in a vertical plane with respect to the other, and preferably also angled in a horizontal plane.

Another feature is the provision of structure for this purpose which is simple and inexpensive to manufacture, sturdy in use, and readily adjustable with a high degree of accuracy to meet various conditions in different theatres.

Other objects, features and advantages of the invention will become apparent as the following detailed description of one form of the invention proceeds, reference being had to the accompanying drawings, wherein:

Fig. 1 is a side elevation, partly broken away, of one form of construction in accordance with the invention, showing one manner of tilting the lens system;

Fig. 2 is a view similar to Fig. 1, but partly in section;

Fig. 3 is a horizontal section taken on the line 3—3 of Fig. 1, looking in the direction of the arrows, and showing one manner of angling the lens system;

Fig. 4 is a sectional view, partly broken away, and taken on the line 4—4 of Fig. 3, looking in the direction of the arrows;

Fig. 5 is a somewhat diagrammatic side elevational view of a machine in accordance with the invention, a screen being shown on much reduced scale;

Fig. 6 is a diagrammatic view illustrating the invention as applied to a pair of projecting machines, each at one side of the center of the screen;

Fig. 7 is a plan view of one form of yoke for supporting the optical system in accordance with the invention;

Fig. 8 is an exaggerated diagrammatic view showing in dotted lines a picture deformed due to the projector being above the screen, and in full lines a picture projected by a machine according to the invention and having the optical axis tilted out of the perpendicular to the gate.

Referring to the drawings, and especially to Figs. 1 to 4, there is shown at 5 a rigid frame or pedestal which stands upright on the floor of the projection booth. Upon this frame there is mounted through post 4 a head 6 containing mechanism for feeding the film through the machine, and including a film gate or aperture 7 which is preferably maintained parallel to the screen. Any suitable sound reproducing device (not shown), for use with films, including sound records if desired, may also be mounted on the head 6. With this construction of the projecting machine a firm support is provided for the head, which support need never be disturbed once it has been adjusted to proper position, in any convenient manner.

The optic system, consisting of the lamp house 8, lamp 9, condenser lens system 10, and the lenses 11, is advantageously mounted on a cradle 12 which is supported on the frame 5 for angling in a vertical plane. As best shown in Figs. 3 and 7, the cradle 12 may take the form of a yoke composed of two arms 13 and 13' having end portions 14 and 14' which are bolted together as by bolts 15, or otherwise secured together, and to which the lamp house and lens system may be secured in any suitable manner. The arms 13 are preferably curved in the form of a semi-circle and may be mounted in opposed slots 17 formed in a collar 16 journalled on post 4. The arms 13 are preferably substantially semi-circular in shape and extent, to mount the lamp and lenses in aligned relation with the center of the aperture. The slots are similarly curved.

Arm 13 is provided on its upper side with teeth 18 for engagement with a large gear 19 carried on a shaft 20 journalled in any convenient manner in collar 16. Small worm gear 21, on shaft 22 meshes with gear 19. Shaft 22 is provided with a hand-wheel 23 and is journalled in the collar 16. Suitable recesses 24, 25 may be provided in the collar 16 for receiving the gears 19 and 21. Through this reduction gearing, upon rotation of hand-wheel 23 the yoke will be translated and will thus swing or tilt the optic system in a vertical plane through the desired angle with respect to the film gate and film feeding portions of the machine.

As best shown by dotted lines in Fig. 1, the optical system may be trained on a screen below the projector by rotating the hand-wheel 23 in a counterclockwise direction, while the gate or aperture, in which the film section being projected is located, is maintained parallel to the screen. An opposite rotation of the hand-wheel adjusts the projector for conditions where the screen is above the projector. Through the present development, wherein the optical system is tilted with respect to the gate, or in other words, wherein the gate is tilted out of the optic axis, but is mainained parallel to the screen, the projected picture is in proper proportions, as indicated in solid lines in Fig. 8.

Similarly, as shown in Fig. 6, by angling the optical system in a horizontal plane with respect to the gate, and maintaining the latter parallel to the screen, defective proportions in the projected picture may be avoided, where the projector is off-center with respect to the screen. This may be accomplished by turning the collar 16 through the proper angle to focus the optic axis on the center of the screen. Suitable mechanism such as reduction gearing (not shown) may be employed for angling the collar, and any suitable locking device (not shown) may be employed to fasten the parts in adjusted relation.

Whereas a considerable tilting in a vertical plane may be required in modern theatres, to obviate gross errors in the projected pictures on account of the ordinarily great height of the projector above the screen, a very slight angling in the horizontal plane is usually sufficient, and the latter may even be dispensed where the errors are negligible. Accordingly, although provision is made, in the preferred form of construction for universal relative movement between the gate and optical system, it will be understood that the tilting mechanism may be employed in the absence of the mechanism providing for angling. On the other hand, it is conceivable that the angling mechanism may be advantageous without the tilting means, and such falls within the spirit of the invention.

It will be understood that the present improvement thus provides simple and readily adjustable means for projecting a true picture under indicated conditions, i. e., where the projector is above or below the level of the screen, or at one side of the center plane of the house. In the form of the construction shown this is accomplished by maintaining the film gate or aperture and screen parallel and by tilting or angling the lens system as required by conditions. If the screen is tilted back somewhat, and it is desired to tilt the film at the same angle, the head 6 of the present construction may be tilted as by shimming up part of it or otherwise to bring the film gate parallel to the screen.

In conclusion, it will be particularly noted that there is provided an improved device which when adjusted automatically relatively positions the gate and optical system so that the proper width and proportions of pictures on the screen are maintained, and there is not to be found the former condition of having the bottom of the pictures on the screen materially wider than the top, as shown by dotted lines in Fig. 8.

Inasmuch as the foregoing specification describes how the improved results may be achieved, it is not deemed necessary to enter upon any discussion of the theory underlying my invention.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. In a machine for projecting motion pictures onto a screen, in combination, a rigid support, film feeding means including a film gate carried by said support in a plane substantially parallel to said screen upon which the pictures are projected, and means to mount a lamp on one side of said gate and a lens on the opposite side of said gate in aligned relation, and to simultaneously tilt said lamp and lens through equal and opposite angles.

2. In a machine for projecting motion pictures onto a screen, in combination, a rigid support, film feeding means including a film gate carried by said support in a plane substantially parallel to said screen upon which the pictures are projected, and means to mount a lamp on one side of said gate and a lens on the opposite side of said gate in aligned relation, and to simultaneously tilt said lamp and lens through equal and opposite angles, said means comprising a unitary member secured to the lamp and the lens.

3. In a motion picture projector, a support, a cradle carried on said support and comprising a generally semi-circular member, a lamp house mounted on one end of said cradle, a lens mounted on the other end of said cradle, and means carried by the support adjustably to angle the member.

4. In a motion picture projector, a support, a cradle carried on said support and comprising a generally semi-circular yoke extending at either side of said support, a lamp house secured to one end of said yoke, a lens secured to the other end of said yoke, and reduction gearing operatively connected to said yoke for angling the yoke with respect to the support.

5. In apparatus of the character described, a standard for supporting film feeding mechanism, a film gate rigidly mounted on said standard, a semi-circular yoke carried with said standard, reduction gearing operatively connected with said yoke, and a lamp and lens mounted on said yoke on opposite sides of said gate, whereby said gearing angles the lamp and lens with respect to the gate.

6. In a motion picture projecting machine, in combination, a pedestal, means to mount a head including film feeding mechanism and a gate rigidly upon said pedestal, means to mount an optical system including a lamp and a lens system in aligned relation, said means being adapted for angling in a horizontal plane with respect to said gate, and means carried with said last-named means for tilting said lamp and lens system simultaneously through equal and opposite angles in a vertical plane.

7. In a motion picture projector, a film gate, means to mount a lens and lamp house on opposite sides of the gate and to angle the lamp house and lens simultaneously and equally, and means to mount the entire first named means for pivoting in a horizontal plane with respect to said gate.

EWALD BOECKING.